(12) United States Patent
Trend

(10) Patent No.: US 9,436,328 B2
(45) Date of Patent: Sep. 6, 2016

(54) SINGLE-LAYER TOUCH SENSOR

(71) Applicant: Matthew Trend, Fareham (GB)

(72) Inventor: Matthew Trend, Fareham (GB)

(73) Assignee: Atmel Corporation, San Jose, CA (US)

(*) Notice: Subject to any disclaimer, the term of this patent is extended or adjusted under 35 U.S.C. 154(b) by 0 days.

(21) Appl. No.: 14/310,864

(22) Filed: Jun. 20, 2014

(65) Prior Publication Data

US 2015/0370363 A1    Dec. 24, 2015

(51) Int. Cl.
*G06F 3/044*    (2006.01)

(52) U.S. Cl.
CPC ..... *G06F 3/044* (2013.01); *G06F 2203/04103* (2013.01)

(58) Field of Classification Search
CPC ............ G06F 3/044; G06F 2203/04111
See application file for complete search history.

(56) References Cited

U.S. PATENT DOCUMENTS

| | | |
|---|---|---|
| 7,663,607 B2 | 2/2010 | Hotelling |
| 7,864,503 B2 | 1/2011 | Chang |
| 7,875,814 B2 | 1/2011 | Chen |
| 7,920,129 B2 | 4/2011 | Hotelling |
| 8,031,094 B2 | 10/2011 | Hotelling |
| 8,031,174 B2 | 10/2011 | Hamblin |
| 8,040,326 B2 | 10/2011 | Hotelling |
| 8,049,732 B2 | 11/2011 | Hotelling |
| 8,179,381 B2 | 5/2012 | Frey |
| 8,217,902 B2 | 7/2012 | Chang |
| 8,723,824 B2 | 5/2014 | Myers |
| 2008/0309635 A1 | 12/2008 | Matsuo |
| 2009/0315854 A1 | 12/2009 | Matsuo |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2013/0181943 A1* | 7/2013 | Bulea et al. .................. 345/174 |

FOREIGN PATENT DOCUMENTS

WO    WO 2012/129247 A2    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, ROthkopf.

* cited by examiner

*Primary Examiner* — Christopher E Leiby
(74) *Attorney, Agent, or Firm* — Baker Botts L.L.P.

(57) ABSTRACT

In one embodiment, a touch sensor includes a first electrode and a second electrode. At least a portion of the second electrode is interdigitated with the first electrode. The first electrode includes a base portion, a digit and an extent. The digit includes a first end and a second end, connects to the base portion at the first end, and extends from the base portion in a first direction along a first axis. The extent connects to the digit at the second end and extends from the digit along a second axis that is substantially perpendicular to the first axis.

20 Claims, 7 Drawing Sheets

SINGLE-LAYER TOUCH SENSOR

TECHNICAL FIELD

This disclosure generally relates to touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, where appropriate. When an object touches or comes within proximity of the surface of the capacitive touch screen, a change in capacitance may occur within the touch screen at the location of the touch or proximity. A touch-sensor controller may process the change in capacitance to determine its position on the touch screen.

DESCRIPTION OF EXAMPLE EMBODIMENTS

Figure 1:
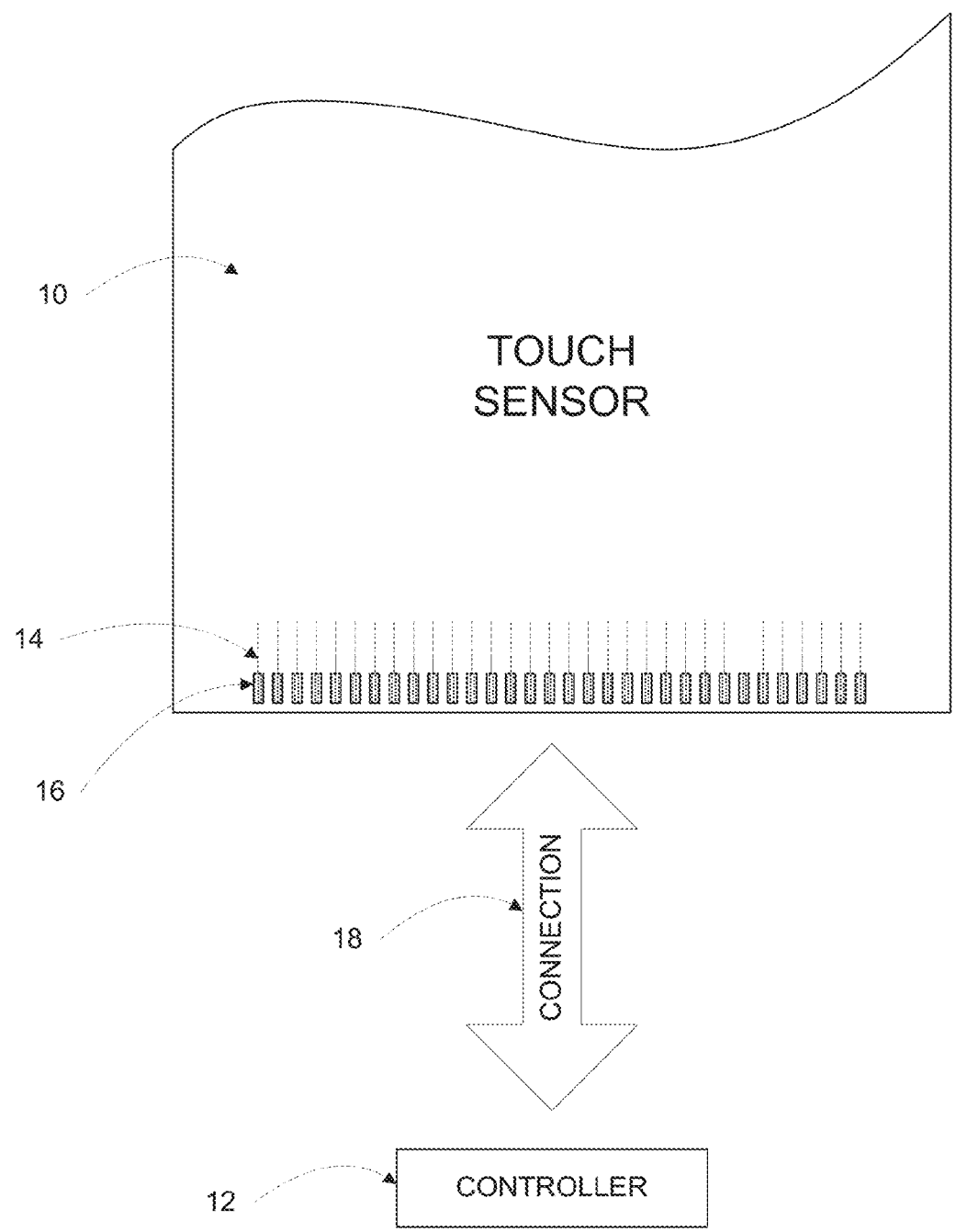
FIG. 1 illustrates an example touch sensor with an example touch-sensor controller.

FIG. 1 illustrates an example touch sensor 10 with an example touch-sensor controller 12. Touch sensor 10 and touch-sensor controller 12 may detect the presence and location of a touch or the proximity of an object within a touch-sensitive area of touch sensor 10. Herein, reference to a touch sensor may encompass both the touch sensor and its touch-sensor controller, where appropriate. Similarly, reference to a touch-sensor controller may encompass both the touch-sensor controller and its touch sensor, where appropriate. Touch sensor 10 may include one or more touch-sensitive areas, where appropriate. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, where appropriate. Alternatively, where appropriate, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, carbon, or a copper- or silver- or carbon-based material, and the fine lines of conductive material may occupy approximately 5% of the area of its shape in a hatched, mesh, or other suitable pattern. Herein, reference to FLM encompasses such material, where appropriate. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

Where appropriate, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PUMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, where appropriate, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and touch-sensor controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other suitable conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

Touch sensor 10 may implement a capacitive form of touch sensing. In a mutual-capacitance implementation, touch sensor 110 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by touch-sensor controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and touch-sensor controller 12 may measure the change in capacitance. By measuring changes in capacitance throughout the array, touch-sensor controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and touch-sensor controller 12 may measure the change in capacitance, for example, as a change in the amount of charge needed to raise the voltage at the capacitive node by a pre-determined amount. As with a mutual-capacitance implementation, by measuring changes in capacitance throughout the array, touch-sensor controller 12 may determine the position of the touch or proximity within the touch-sensitive area(s) of touch sensor 10. This disclosure contemplates any suitable form of capacitive touch sensing, where appropriate.

In particular embodiments, one or more drive electrodes may together form a drive electrode line running horizontally or vertically or in any suitable orientation. Similarly, one or more sense electrodes may together form a sense electrode line running horizontally or vertically or in any suitable orientation. Additionally, one or more ground electrodes may together form a ground electrode line running horizontally or vertically or in any suitable orientation. In particular embodiments, drive electrode lines may run substantially perpendicular to sense electrode lines. In particular embodiments, drive electrode lines may run substantially parallel to sense electrode lines. Herein, reference to a drive electrode line may encompass one or more drive electrodes making up the drive electrode line, and vice versa, where appropriate. Similarly, reference to a sense electrode line may encompass one or more sense electrodes making up the sense electrode line, and vice versa, where appropriate. Additionally, reference to a ground electrode line may encompass one or more ground electrodes making up the ground electrode line, and vice versa, where appropriate. In particular embodiments, any electrode may be configured as a drive, sense, or ground electrode and the configuration of any electrode may be changed during operation of touch sensor 10. In particular embodiments, configuration of electrodes may be controlled by touch-sensor controller 12.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

In particular embodiments, touch sensor 10 may determine the position of an object (such as a stylus or a user's finger or hand) that makes physical contact with a touch-sensitive area of touch sensor 10. In addition or as an alternative, in particular embodiments, touch sensor 10 may determine the position of an object that comes within proximity of touch sensor 10 without necessarily contacting touch sensor 10. In particular embodiments, an object may come within proximity of touch sensor 10 when it is located some distance above a surface of touch sensor 10; when it hovers in a particular position above a surface of touch sensor 10; when it makes a motion (such as for example a swiping motion or an air gesture) above a surface of touch sensor 10; or any suitable combination of the above. In particular embodiments, determining the position of an object that comes within proximity of touch sensor 10 without making physical contact may be referred to as determining the proximity of an object. In particular embodiments, determining the proximity of an object may comprise determining the position of an object's projection onto touch sensor 10 when the object is located some distance above a plane of touch sensor 10. The projection of an object onto touch sensor 10 may be made along an axis that is substantially orthogonal to a plane of touch sensor 10. In particular embodiments, the position of an object's projection onto touch sensor 10 may be referred to as the position or the location of an object. As an example and not by Way of limitation, touch sensor 10 may determine the position of an object when the object is located above the surface of touch sensor 10 and within a distance of approximately 20 mm of the surface of touch sensor 10. Although this disclosure describes or illustrates particular touch sensors that may determine a position of physical contact of an object, a proximity of an object, or a combination of the two, this disclosure contemplates any suitable touch sensor 10 suitably configured to determine a position of physical contact of an object, a proximity of an object, or any suitable combination of one or more of the above.

As described above, a change in capacitance at a capacitive node of touch sensor 10 may indicate a touch or proximity input at the position of the capacitive node. Touch-sensor controller 12 may detect and process the change in capacitance to determine the presence and location of the touch or proximity input. Touch-sensor controller 12 may then communicate information about the touch or proximity input to one or more other components (such one or more central processing units (CPUs)) of a device that includes touch sensor 10 and touch-sensor controller 12, which may respond to the touch or proximity input by initiating a function of the device (or an application running on the device). Although this disclosure describes a particular touch-sensor controller having particular functionality with respect to a particular device and a particular touch sensor, this disclosure contemplates any suitable touch-sensor controller having any suitable functionality with respect to any suitable device and any suitable touch sensor.

Touch-sensor controller 12 may be one or more integrated circuits (ICs), such as for example general-purpose microprocessors, microcontrollers, programmable logic devices or arrays, application-specific ICs (ASICs). In particular embodiments, touch-sensor controller 12 comprises analog circuitry, digital logic, and digital non-volatile memory. In particular embodiments, touch-sensor controller 12 is disposed on a flexible printed circuit (FPC) bonded to the substrate of touch sensor 10, as described below, The FPC may be active or passive, where appropriate. In particular embodiments, multiple touch-sensor controllers 12 are disposed on the FPC. Touch-sensor controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, where appropriate. Although this disclosure describes a particular touch-sensor controller having a particular implementation with particular components, this disclosure contemplates any suitable touch-sensor controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to touch-sensor controller 12. Tracks 14 may extend into or around (e.g. at the edges of) the touch-sensitive area(s) of touch sensor 10. Particular tracks 14 may provide drive connections for coupling touch-sensor controller 12 to drive electrodes of touch sensor 10, through which the drive unit of touch-sensor controller 12 may supply drive signals to the drive electrodes. Other tracks 14 may provide sense connections for coupling touch-sensor controller 12 to sense electrodes of touch sensor 10, through which the sense unit of touch-sensor controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 µm or less. As another example, the conductive material of tracks 14 may be silver or silver-based and have a width of approximately 100 µm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground electrode lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, touch-sensor controller 12 may be on an FPC. Connection pads 16 may be made of the same material as tracks 14 and may be bonded to the FPC using an anisotropic conductive film (ACF). Connection 18 may include conductive lines on the FPC coupling touch-sensor controller 12 to connection pads 16, in turn coupling touch-sensor controller 12 to tracks 14 and to the drive or sense electrodes of touch sensor 10. In another embodiment, connection pads 16 may be connected to an electro-mechanical connector such as a zero insertion force wire-to-board connector); in this embodiment, connection 18 may not need to include an FPC. This disclosure contemplates any suitable connection 18 between touch-sensor controller 12 and touch sensor 10.

Figure 2A:
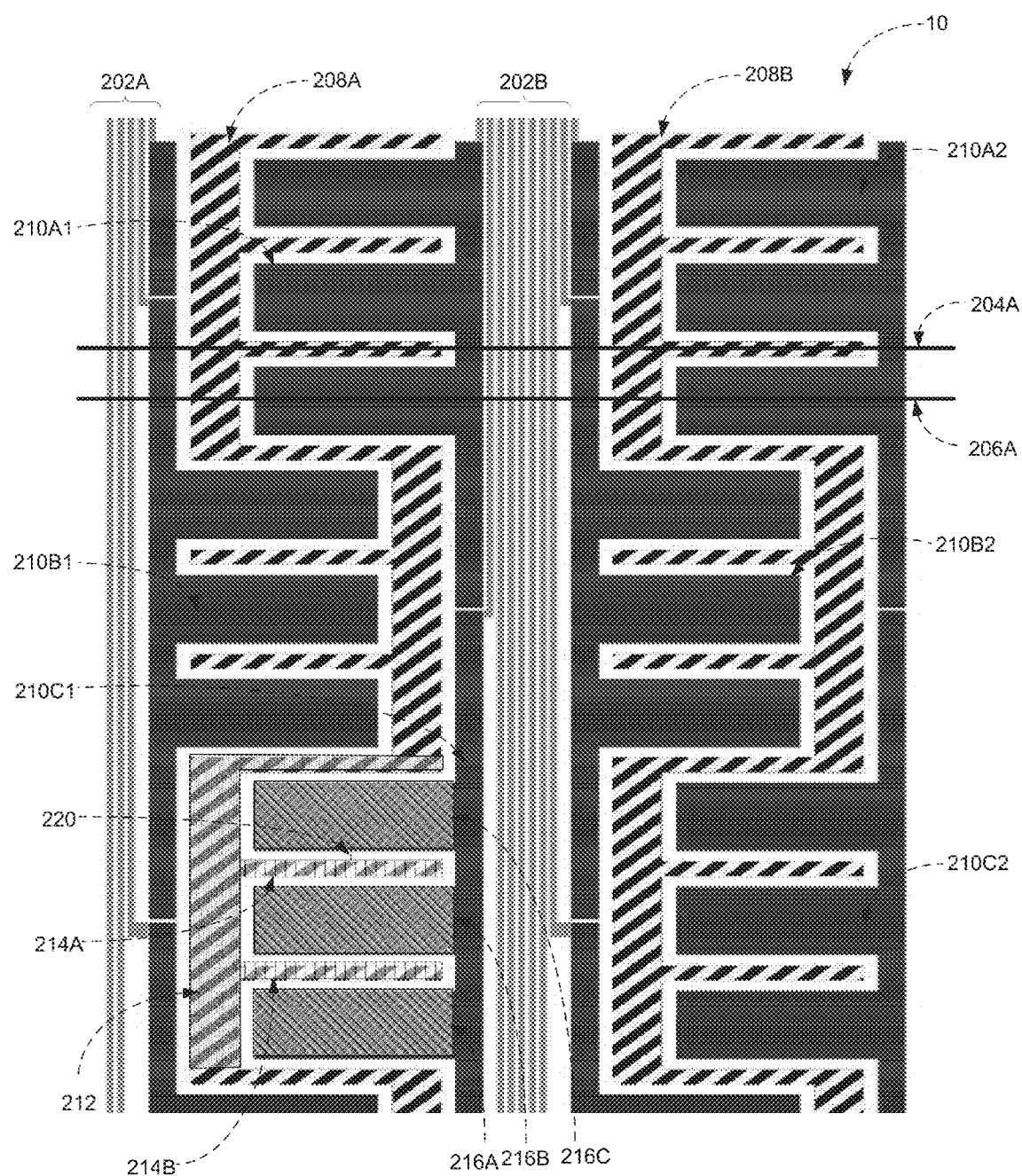
FIG. 2A illustrates an example pattern for an example single-layer touch sensor.

FIG. 2A (which is not necessarily shown to scale) illustrates an example single-layer touch sensor for use in the example system of FIG. 1. In the example of FIG. 2A, touch sensor 10 includes tracking areas 202A-B and a touch-sensitive area. Herein, reference to a touch sensor may encompass one or more of a tracking area and a touch-sensitive area, where appropriate. The touch-sensitive area of touch sensor 10 includes an array of sense electrode lines 208A-B and an array of drive electrode lines 210A-C. Herein, reference to a touch-sensitive area of a touch sensor may encompass one or more of a drive electrode line and one or more of a sense electrode line, where appropriate. In the example of FIG. 2A, drive electrode lines 210[A/B/C] extend substantially in parallel along a longitudinal axis of touch sensor 10. In contrast, sense electrode lines 208A-B extend substantially in parallel along a latitudinal axis of touch sensor 10. Each sense electrode line 208[A/B] further includes a sense electrode while each drive electrode line 210[A/B/C] further includes one or more drive electrodes. Herein, reference to an electrode line may encompass one or more of an electrode, where appropriate. If an electrode line includes only one electrode (such as sense electrode line 208[A/B] as described above), reference to the electrode line may encompass the electrode, and vice-versa, where appropriate. In the example of FIG. 2A, drive electrodes 210[A-C][1-2] are disposed serially along the longitudinal axis of touch sensor 10. Although this disclosure describes and illustrates a touch-sensitive area of touch sensor 10 as including both drive and sense electrodes, this disclosure contemplates the touch-sensitive area of touch sensor 10 including electrodes of a single type, where appropriate. Furthermore although this disclosure describes and illustrates one or more of a particular electrode together forming a particular electrode line that extends in a particular orientation, this disclosure contemplates one or more of any suitable electrode forming any suitable electrode line that extends in any suitable orientation. As an example and not by way of limitation, sense electrode lines may extend substantially parallel to drive electrode lines, as described above. As another example and not by way of limitation, each electrode line 208[A/B] may include a drive electrode and each electrode line 210[A/B/C] may include one or more sense electrodes. In the example of FIG. 2A, tracking areas 202A-B include tracks 14 that facilitate coupling of sense electrodes 208A-B and drive electrodes 210[A-C][1-2] to a touch-sensor controller 12, as described above. Although this disclosure describes and illustrates tracks 14 of tracking areas 202A-B extending continuously in a particular orientation, tracks 14 of tracking areas 202A-B may extend in any suitable orientations, where appropriate.

An electrode (whether a drive electrode or a sense electrode) may be an area of conductive material forming a shape, such as for example a disc, square, rectangle, other suitable shape, or suitable combination of these. In particular embodiments, an electrode may include an array of repeated conductive materials. Each conductive material of the array of repeated conductive materials has the same pattern. As an example of FIG. 2A, sense electrode 208A includes a column array of repeated conductive materials disposed serially along the latitudinal axis. Furthermore the repeated conductive materials are disposed such that the next conductive material mirrors the last conductive material along the latitudinal axis. Each repeated conductive material of sense electrode 208A includes a base portion and two digits. As an example of FIG. 2A, an example repeated conductive material includes a base portion 212 and two digits 214A-B. Each digit 214[A/B] connects to base portion 212 at a first end and extends from base portion 212 in a first direction along the longitudinal axis. The base portion 212 extends substantially parallel along the latitudinal axis. As another example of FIG. 2A, sense electrode 208A includes a plurality of base portions that are each connected in series to at least one adjacent mirrored base portion. Although this disclosure describes and illustrates a repeated conductive material of a particular electrode of touch sensor 10 as having a base portion 212 and two digits 214A-B connected in a particular manner, this disclosure contemplates any suitable repeated conductive material of any suitable electrode of touch sensor 10 as having any suitable number of any suitable base portions and any suitable number of any suitable digits connected in any suitable manner. Furthermore although this disclosure describes and illustrates a particular electrode of touch sensor 10 having a particular pattern, this disclosure contemplates any suitable electrode of touch sensor 10 having any suitable pattern (or shape) or any suitable combination of any suitable patterns (or shapes). As an example of FIG. 2A and not by way of limitation, drive electrode 210C1 includes digits 216A-C that extend substantially perpendicularly from a base portion of drive electrode 210C1.

Each of the drive electrodes may include a plurality of digits that extend along the longitudinal axis in a particular direction from a base portion. Corresponding sense electrode may include a plurality of digits that extend along the longitudinal axis at least in an opposite direction from a base portion. Particular digits of the drive electrode may be adjacent to a digit of the corresponding sense electrode forming capacitive coupling edges separated by a gap. As such, the digits of the drive and sense electrodes may be interdigitated (or interleaved) to increase the number of capacitive coupling edges around one or more drive electrodes and a corresponding sense electrode. As an example of FIG. 2A and not by way of limitation, digits 216A-C of drive electrode 210C1 may be interdigitated with digits 214A-B of corresponding sense electrode 208A. Capacitive coupling between drive electrode 210C1 and corresponding sense electrode 208A may be determined at least by gap 220 and edges of digits 214A-B and 216A-C. Although this disclosure describes and illustrates a particular arrangement of electrodes for touch sensor 10, this disclosure contemplates any suitable arrangement of electrodes for touch sensor 10.

Figure 2B:
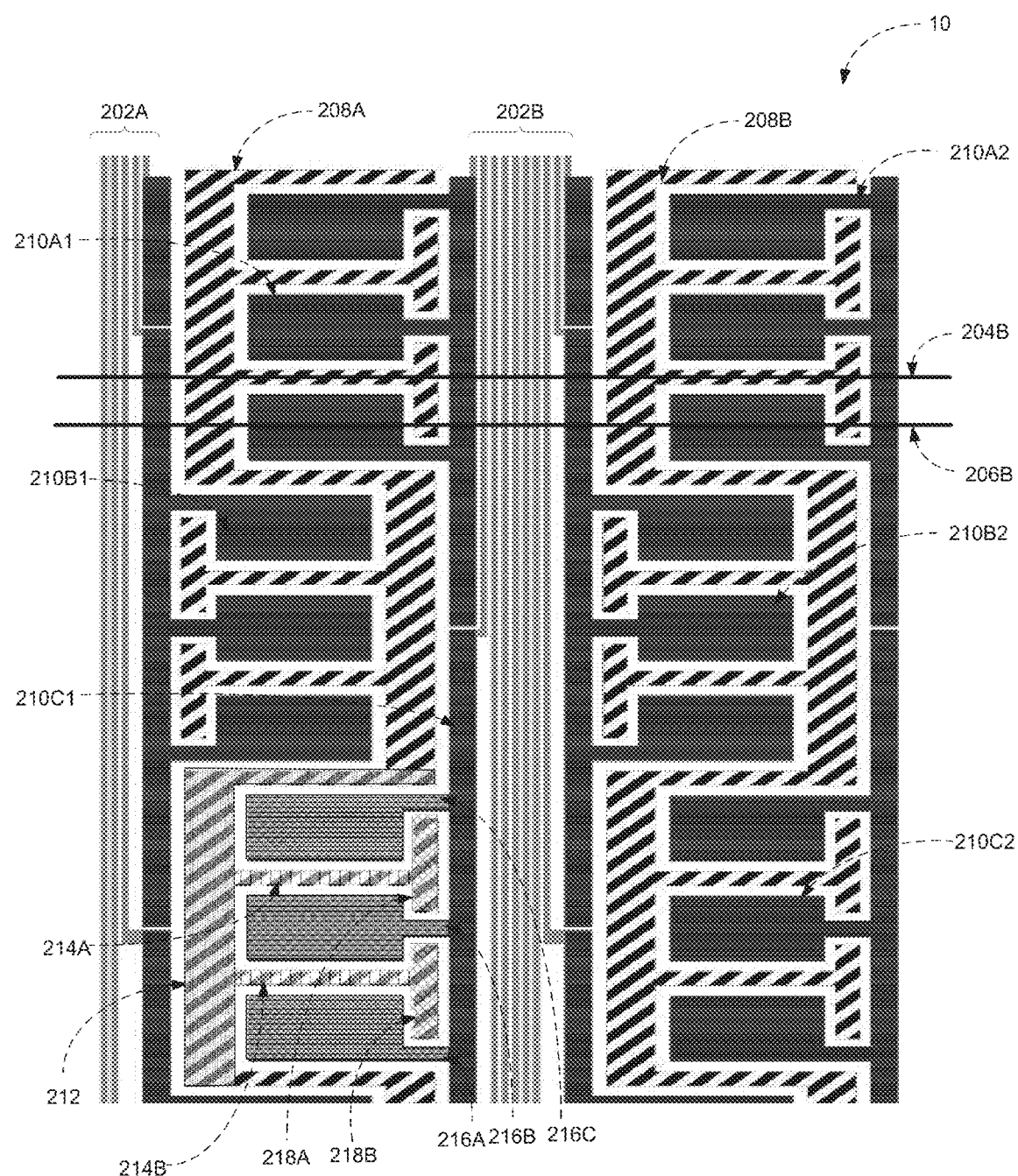
FIG. 2B illustrates another example pattern for an example single-layer touch sensor.

FIG. 2B (which is not necessarily shown to scale) illustrates another example single-layer touch sensor for use in the example system of FIG. 1. In the example of FIG. 2B, an example repeated conductive material of sense electrode 208A further includes extents 218A-B disposed substantially in parallel to base portion 212 of the repeated conductive material. Each extent 218[A/B] connects to a second end of the corresponding digit 214[A/B] and comprises extensions along the latitudinal axis in first and second directions. Accordingly, the shapes of digits 216A-C of corresponding drive electrode 210C1 may change to accommodate the extents 218A-B. As an example and not by way of limitation, the shapes of digits 216A-C may change to preserve consistency of the width of gap 220 between each digit 216A-C and its corresponding sense electrode 208A, as illustrated by FIG. 2B. In particular embodiments, extents 218A-B may increase capacitive coupling of sense electrode 208A with one or more adjacent drive electrodes. As an example of FIG. 2B (and illustrated more clearly in FIGS. 3A-B) and not by way of limitation, extents 218A-B may improve capacitive coupling between sense electrode 208A and drive electrode 210C1 by substantially increasing the electric field around the edges of extents 218A-B. As a result of the increase, the strength of the electric field between sense electrode 208A and drive electrode 210C1 as located around extent 218A may be substantially similar to the strength of the electric field between sense electrode 208A and drive electrode 210B1 as located around base portion 212. In particular embodiments, the increase in the electric field may improve the detection of any movement of any object that comes within proximity of extents 218A-B of touch sensor 10. Although this disclosure describes and illustrates particular electrode as having particular pattern that substantially enhances a capacitive coupling of the particular electrode with particular adjacent electrode in a particular way, this disclosure contemplates any suitable electrode having any suitable pattern that substantially enhances any capacitive coupling of the particular electrode with one or more of an adjacent electrode in any suitable manner.

Figure 3A:
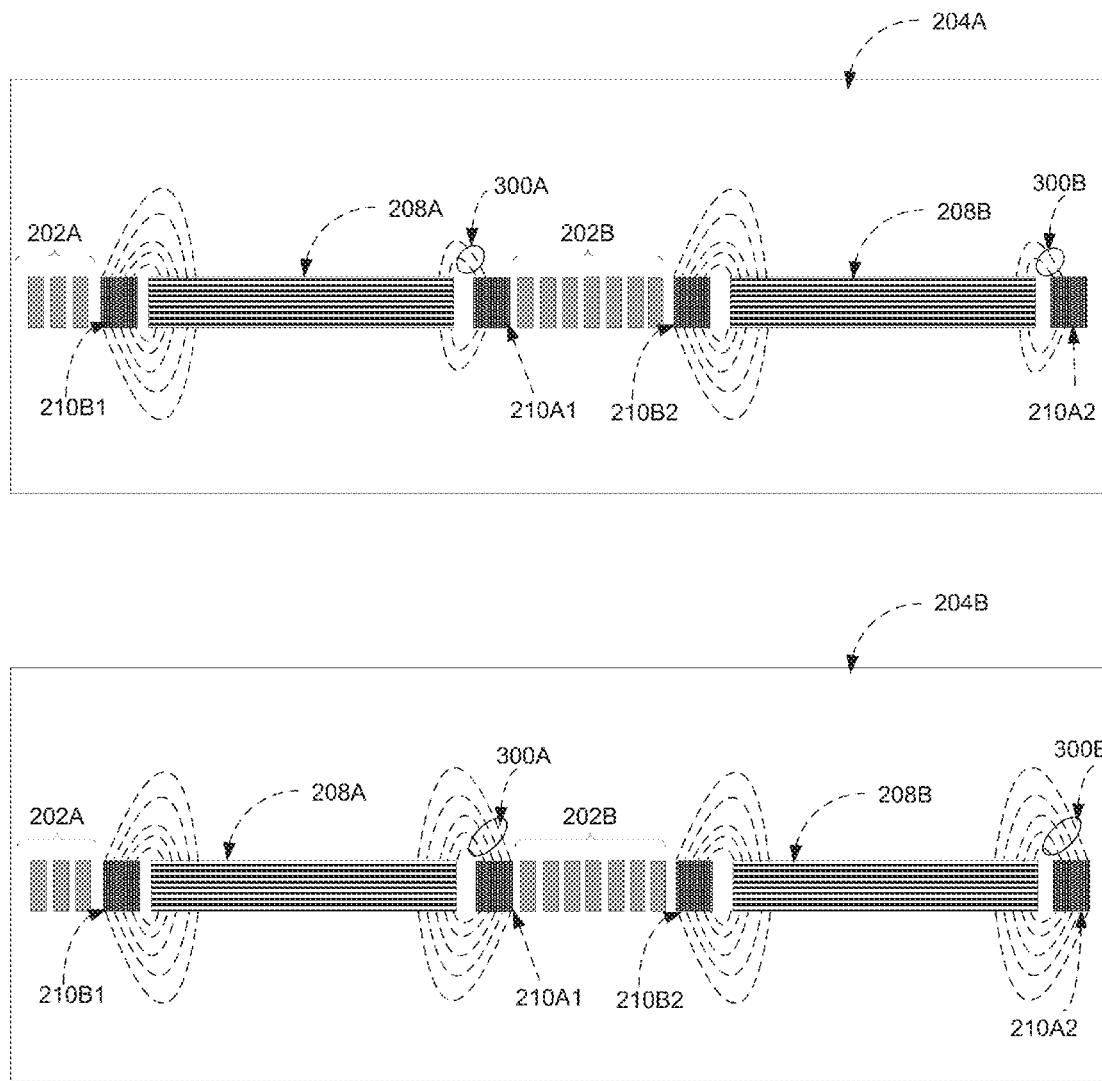
FIG. 3A illustrates cross-sectional views of the single-layer touch sensor of FIGS. 2A-B with example electric fields.

FIG. 3A (which is not necessarily shown to scale) illustrates cross-sectional views 204A-B of the single-layer touch sensor of FIGS. 2A-B with example electric fields 300A-B. In the example of FIG. 3A, cross-sectional views 204A-B illustrate and describe electric fields 300A-B of sense electrodes 208A-B of FIG. 2A while cross-sectional view 204B illustrates and describes electric fields 300A-B of sense electrodes 208A-B of FIG. 2B. In comparison with cross-sectional view 204A, electric fields 300A-B of cross-sectional view 204B includes additional electric-field lines, The additional electric-field lines may be provided at least by the extents in each repeated conductive material of sense electrodes 208A-B, as described above. The additional electric-field lines may enhance the strength of the corresponding electric fields 300A-B. As another example of cross-sectional view 204B, electric field 300A extending between sense electrode 208A and drive electrode 210A1 may at least be substantially balanced with the electric field extending between sense electrode 208A and drive electrode 210B1. Similarly, electric field 300B extending between sense electrode 208B and drive electrode 210A2 may at least be substantially balanced with the electric field extending between sense electrode 208B and drive electrode 210B2. Although this disclosure illustrates and describes particular cross-sectional views of particular touch sensor with particular electric fields between particular electrodes of particular touch sensor, this disclosure contemplates any suitable cross-sectional views of any suitable touch sensor with any suitable electric fields between any suitable electrodes of the touch sensor.

Figure 3B:
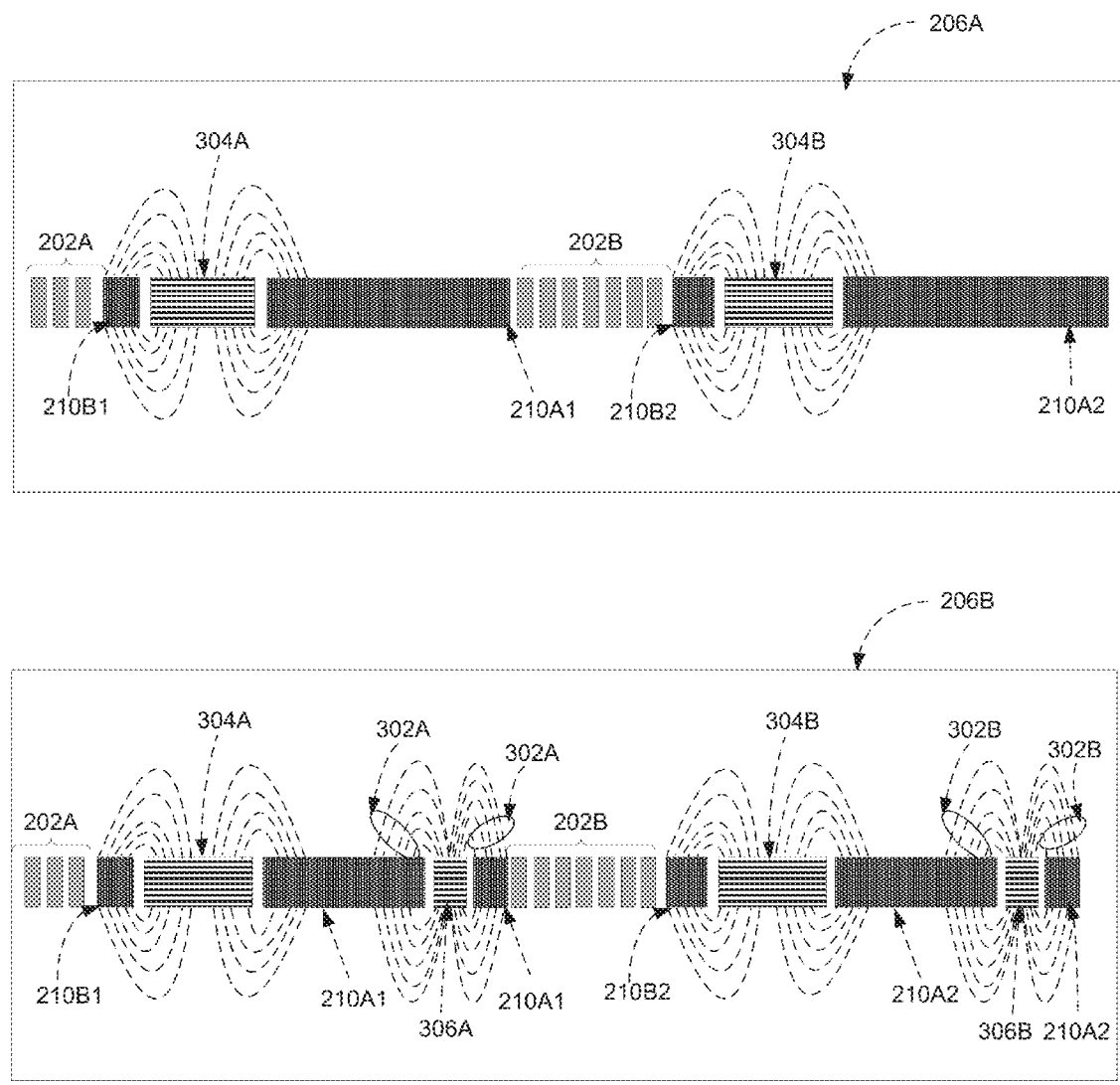
FIG. 3B illustrates other cross-sectional views of the single-layer touch sensor of FIGS. 2A-B with example electric fields.

FIG. 3B (which is not necessarily shown to scale) illustrates other cross-sectional views 206A-B of the single-layer touch sensor of FIGS. 2A-B with example electric fields 302A-B. In the example of FIG. 3B, cross-sectional views 206A-B illustrate and describe electric fields extending between base portion 304A of sense electrode 208A and drive electrodes 210A1 and 210B1. Similarly, cross-sectional views 206A-B illustrate and describe electric fields extending between base portion 3049 of sense electrode 208B and drive electrodes 210A2 and 210B2. Furthermore, cross-sectional view 206B illustrates and describes new electric field 302A extending between extent 306A (of sense electrode 208A) and drive electrode 210A1. Similarly, cross-sectional view 206B illustrates and describes new electric field 302B extending between extent 3069 (of sense electrode 208B) and drive electrode 210A2. Electric fields 302A-B may be caused at least by extents 306A-B, as described above. Although this disclosure illustrates and describes particular cross-sectional views of particular touch sensor with particular electric fields extending between particular electrodes of the touch sensor, this disclosure contemplates any suitable cross-sectional views of any suitable touch sensor with any suitable electric fields extending between any suitable electrodes of the touch sensor.

Figure 4A:
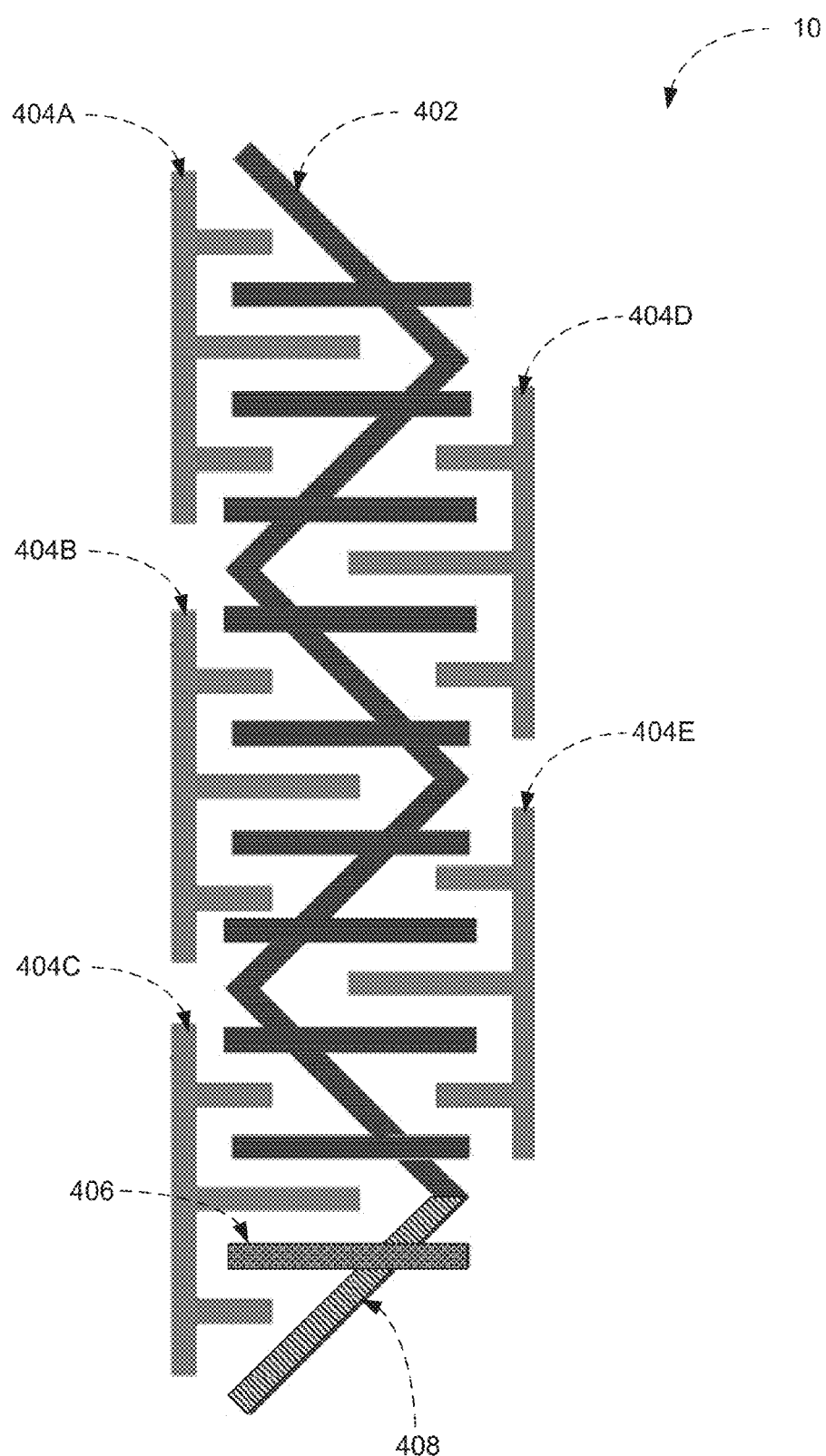
FIG. 4A illustrates another example pattern for an example single-layer touch sensor.

FIG. 4A (which is not necessarily shown to scale) illustrates another example single-layer touch sensor for use in the example system of FIG. 1. In the example of FIG. 4A, touch sensor 10 includes a touch-sensitive area comprising sense electrode 402 and drive electrodes 404A-E. Furthermore sense electrode 402 includes a column array of repeated conductive material disposed serially in a serpentine pattern along a latitudinal axis of touch sensor 10. Furthermore the repeated conductive materials are disposed such that the next conductive material mirrors the last conductive material along a longitudinal axis of the touch sensor 10. Each repeated conductive material of sense electrode 402 includes a base portion and a digit. As an example of FIG. 4A, an example repeated conductive material includes base portion 408 and digit 406. Base portion 408 extends diagonally to the latitudinal axis. Digit 406 connects to base portion 408 at a first end and extends substantially obliquely from (or to) base portion 408 without being parallel to base portion 408. As another example of FIG. 4A, sense electrode 402 includes a plurality of base portions that are each connected in series to at least one adjacent mirrored base portion. Each digit of sense electrode 402 interdigitated (or interleaved) with one or more adjacent digits of drive electrodes 404A-E along the latitudinal axis of touch sensor 10. Although this disclosure describes and illustrates a repeated conductive material of a particular electrode of touch sensor 10 as having a base portion 408 and a digit 406 connected in a particular manner, this disclosure contemplates any suitable repeated conductive material of any suitable electrode of touch sensor 10 as having any suitable number of any suitable base portions and any suitable number of any suitable digits connected in any suitable manner. Furthermore although this disclosure describes and illustrates a particular electrode of touch sensor 10 having a particular pattern, this disclosure contemplates any suitable electrode of touch sensor 10 having any suitable pattern (or shape) or any suitable combination of any suitable patterns (or shapes).

Figure 4B:
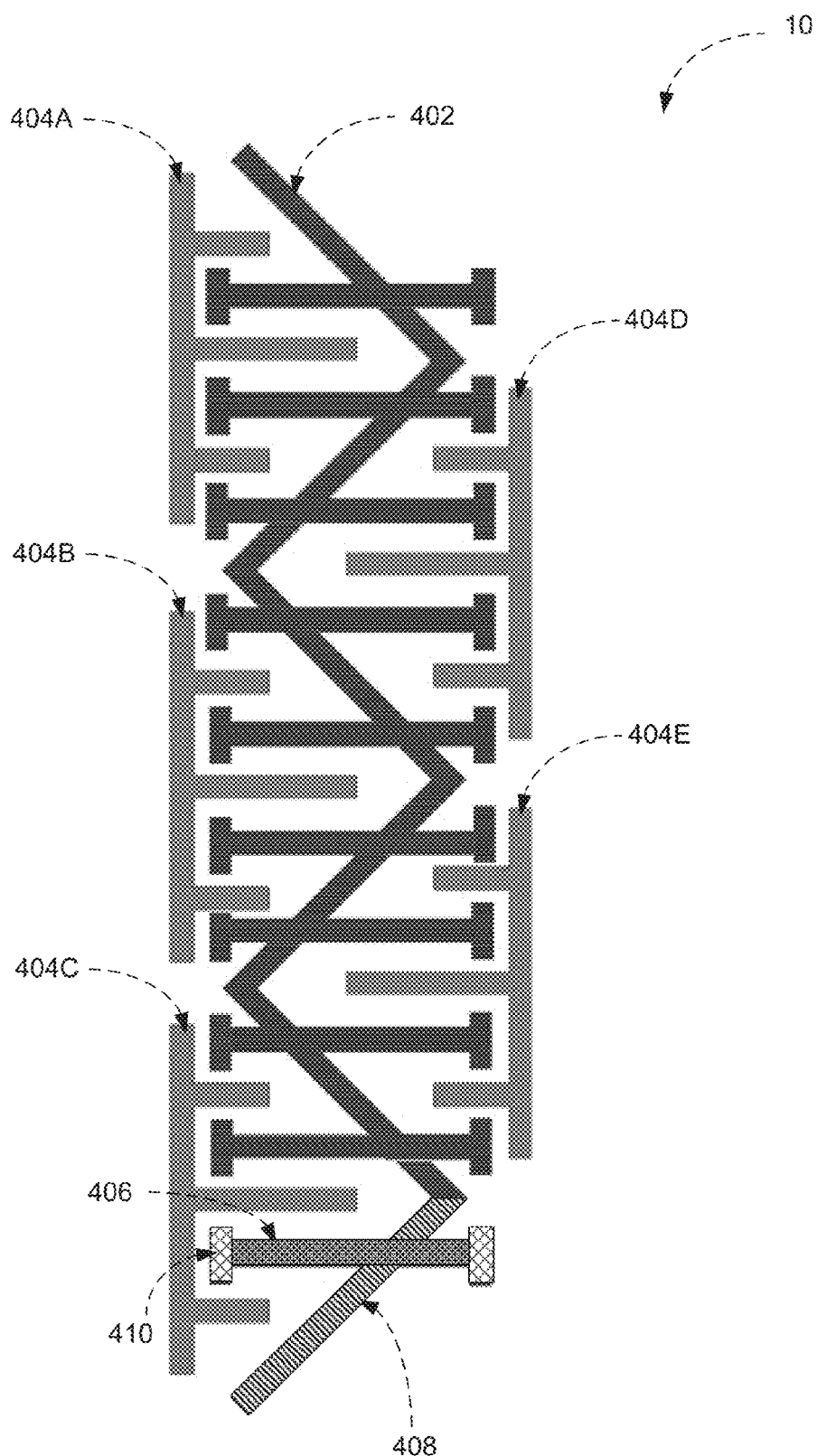
FIG. 4B illustrates another example pattern for an example single-layer touch sensor.

FIG. 4B (which is not necessarily shown to scale) illustrates another example single-layer touch sensor for use in the example system of FIG. 1. In the example of FIG. 4B, each repeated conductive material of sense electrode 402 includes extent 410 disposed substantially parallel to the latitudinal axis of touch sensor 10. Furthermore, extent 410 connects to a second end of the corresponding digit 406 and comprises extensions along the latitudinal axis in first and second directions. In contrast to the example of FIG. 2B, shape of each corresponding adjacent and interleaved digit of drive electrodes 404A-E remains the same. As another example and not by way of limitation, each corresponding adjacent and interleaved digit of drive electrodes 404A-E may be modified such that the width of the dielectric gap between each digit of drive electrodes 404A-E and its corresponding sense electrode 402 may be consistent, as illustrated by FIG. 2B. Similar to the example of FIG. 2B, extent 410 may improve capacitive coupling between sense electrode 402 and drive electrode 404C by substantially increasing the electric field around the edges of extent 410. In particular embodiments, the increase in the electric field may improve the detection of any movement of any object that comes within proximity of extent 410. Although this disclosure describes and illustrates particular electrode as having particular pattern that substantially enhances a capacitive coupling of the particular electrode with particular adjacent electrode in a particular way, this disclosure contemplates any suitable electrode having any suitable pattern that substantially enhances any capacitive coupling of the particular electrode with one or more of an adjacent electrode in any suitable manner.

Herein, reference to a computer-readable non-transitory storage medium or media may include one or more semiconductor-based or other integrated circuits (ICs) (such as, for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, where appropriate. A computer-readable non-transitory storage medium or media may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensor comprising:
   a first electrode that comprises:
      a first base portion;
      a second base portion that comprises a first end and a second end, connects to the first base portion at the first end, and extends substantially perpendicularly from the first base portion;
      a third base portion that connects to the second end of the second base portion and extends substantially perpendicularly from the second base portion;
      a first digit that comprises a first end and a second end, connects to the first base portion at the first end, and extends from the first base portion in a first direction along a first axis;
      a first extent that connects to the first digit at the second end of the first digit and extends from the first digit along a second axis that is substantially perpendicular to the first axis;
      a second digit that comprises a first end and a second end, connects to the third base portion at the first end, extends from the third base portion, and is substantially parallel to the first axis; and
      a second extent that connects to the second digit at the second end of the second digit, extends from the second digit, and is substantially parallel to the second axis;
   a second electrode that comprises:
      a base portion; and
      a digit that comprises a first end and a second end, connects to the base portion of the second electrode at the first end, and extends substantially perpendicularly from the base portion of the second electrode, the digit of the second electrode being at least partially interdigitated with the first digit of the first electrode and the second base portion of the first electrode; and
   a third electrode that comprises:
      a base portion; and
      a digit that comprises a first end and a second end, connects to the base portion of the third electrode at the first end, and extends substantially perpendicularly from the base portion of the third electrode, the digit of the third electrode being at least partially interdigitated with the second digit of the first electrode and the second base portion of the first electrode.

2. The touch sensor of claim 1, wherein the first electrode is a sense electrode and the second electrode is a drive electrode.

3. The touch sensor of claim 1, wherein:
   the first base portion of the first electrode extends parallel to the second axis;
   the first digit of the first electrode extends substantially perpendicularly to the first base portion; and
   the first extent is substantially parallel to the first base portion.

4. The touch sensor of claim 1, wherein:
   the first base portion of the first electrode extends diagonally to the second axis;
   the first digit of the first electrode extends substantially obliquely to the first base portion; and
   the first extent is not substantially parallel to the first base portion.

5. The touch sensor of claim 1, wherein:
   the first electrode composes a first electrode line extending along the second axis; and
   the second electrode is one of a plurality of second electrodes composing a second electrode line extending along the first axis.

6. The touch sensor of claim 5, wherein the first electrode:
   comprises a plurality of base portions that are each connected to at least one adjacent base portion; and
   extends along the second axis in a serpentine pattern.

7. The touch sensor of claim 1, wherein the first electrode comprises a plurality of digits that extend from the first base portion in the first direction along the first axis.

8. The touch sensor of claim 1, wherein:
a first portion of the first extent extends from the first digit of the first electrode along the second axis in a first direction; and
a second portion of the first extent extends from the first digit of the first electrode along the second axis in a second direction that is opposite the first direction.

9. The touch sensor of claim 1, wherein the first and second electrodes are each made of a mesh of fine lines of conductive material.

10. The touch sensor of claim 1, wherein the first and second electrodes are each made of indium tin oxide (ITO).

11. A device comprising:
a touch sensor comprising:
a first electrode that comprises:
a first base portion;
a second base portion that comprises a first end and a second end, connects to the first base portion at the first end, and extends substantially perpendicularly from the first base portion;
a third base portion that connects to the second end of the second base portion and extends substantially perpendicularly from the second base portion;
a first digit that comprises a first end and a second end, connects to the first base portion at the first end, and extends from the first base portion in a first direction along a first axis;
a first extent that connects to the first digit at the second end of the first digit and extends from the first digit along a second axis that is substantially perpendicular to the first axis;
a second digit that comprises a first end and a second end, connects to the third base portion at the first end, extends from the third base portion, and is substantially parallel to the first axis; and
a second extent that connects to the second digit at the second end of the second digit, extends from the second digit, and is substantially parallel to the second axis;
a second electrode that comprises:
a base portion; and
a digit that comprises a first end and a second end, connects to the base portion of the second electrode at the first end, and extends substantially perpendicularly from the base portion of the second electrode, the digit of the second electrode being at least partially interdigitated with the first digit of the first electrode and the second base portion of the first electrode;
a third electrode that comprises:
a base portion; and
a digit that comprises a first end and a second end, connects to the base portion of the third electrode at the first end, and extends substantially perpendicularly from the base portion of the third electrode, the digit of the third electrode being at least partially interdigitated with the second digit of the first electrode and the second base portion of the first electrode; and
one or more computer-readable non-transitory storage media comprising logic that is configured when executed to control the touch sensor.

12. The device of claim 11, wherein the first electrode is a sense electrode and the second electrode is a drive electrode.

13. The device of claim 11, wherein:
the first base portion of the first electrode extends parallel to the second axis;
the first digit of the first electrode extends substantially perpendicularly to the first base portion; and
the extent is substantially parallel to the first base portion.

14. The device of claim 11, wherein:
the first base portion of the first electrode extends diagonally to the second axis;
the first digit of the first electrode extends substantially obliquely to the first base portion; and
the first extent is not substantially parallel to the first base portion.

15. The device of claim 11, wherein:
the first electrode composes a first electrode line extending along the second axis; and
the second electrode is one of a plurality of second electrodes composing a second electrode line extending along the first axis.

16. The device of claim 15, wherein the first electrode:
comprises a plurality of base portions that are each connected to at least one adjacent base portion; and
extends along the second axis in a serpentine pattern.

17. The device of claim 11, wherein the first electrode comprises a plurality of digits that extend from the first base portion in the first direction along the first axis.

18. The device of claim 11, wherein:
a first portion of the first extent extends from the first digit of the first electrode along the second axis in a first direction; and
a second portion of the first extent extends from the first digit of the first electrode along the second axis in a second direction that is opposite the first direction.

19. The device of claim 11, wherein the first and second electrodes are each made of a mesh of fine lines of conductive material.

20. The device of claim 11, wherein the first and second electrodes are each made of indium tin oxide (ITO).

* * * * *